(12) United States Patent
Oosake et al.

(10) Patent No.: US 12,511,879 B2
(45) Date of Patent: Dec. 30, 2025

(54) MACHINE LEARNING SYSTEM, RECOGNIZER, LEARNING METHOD, AND PROGRAM

(71) Applicant: FUJIFILM Corporation, Tokyo (JP)

(72) Inventors: Masaaki Oosake, Kanagawa (JP); Toshihiro Usuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 220 days.

(21) Appl. No.: 18/457,374

(22) Filed: Aug. 29, 2023

(65) Prior Publication Data

US 2023/0410482 A1 Dec. 21, 2023

Related U.S. Application Data

(63) Continuation of application No. PCT/JP2022/008167, filed on Feb. 28, 2022.

(30) Foreign Application Priority Data

Mar. 1, 2021 (JP) ................................. 2021-031699

(51) Int. Cl.
*G06K 9/00* (2022.01)
*G06N 3/0464* (2023.01)
(Continued)

(52) U.S. Cl.
CPC ......... *G06V 10/774* (2022.01); *G06N 3/0464* (2023.01); *G06T 7/0012* (2013.01);
(Continued)

(58) Field of Classification Search
CPC .... G06V 10/774; G06V 10/945; G06V 10/82; G06V 2201/03; G06N 3/0464;
(Continued)

(56) References Cited

U.S. PATENT DOCUMENTS

| 11,501,439 B2 | 11/2022 | Aoyagi et al. |
| 2018/0107901 A1 | 4/2018 | Nakamura et al. |

(Continued)

FOREIGN PATENT DOCUMENTS

| CN | 110728674 A | * | 1/2020 | ........... G06T 7/0012 |
| CN | 111341419 A | * | 6/2020 | ............. G06N 3/045 |

(Continued)

OTHER PUBLICATIONS

"International Search Report (Form PCT/ISA/210) of PCT/JP2022/008167," mailed on May 17, 2022, with English translation thereof, pp. 1-7.

(Continued)

*Primary Examiner* — Xin Jia
(74) *Attorney, Agent, or Firm* — JCIPRNET

(57) ABSTRACT

There are provided a machine learning system, a learning method, and a program that can facilitate learning of a large number of combined medical images. A machine learning system (10) includes: an image database (14) that stores a plurality of medical images; a geometric-shape database (16) that stores geometric shapes to be superimposed on the medical images; a processor (22); and a learning model (30), in which the processor (22) is configured to perform a selection accepting process of accepting selection of a medical image from among the medical images stored in the image database (14) and selection of a geometric shape from among the geometric shapes stored in the geometric-shape database (16), a geometric-shape combining process of combining the selected medical image and the selected geometric shape and generating a composite image, and a training process of making the learning model perform learning by using the composite image.

11 Claims, 15 Drawing Sheets

(51) Int. Cl.
*G06T 7/00* (2017.01)
*G06V 10/774* (2022.01)
*G06V 10/94* (2022.01)
*G16H 30/40* (2018.01)
*G06V 10/82* (2022.01)

(52) U.S. Cl.
CPC ........... *G06V 10/945* (2022.01); *G16H 30/40* (2018.01); *G06T 2207/10132* (2013.01); *G06T 2207/20081* (2013.01); *G06T 2207/20084* (2013.01); *G06T 2207/20104* (2013.01); *G06T 2207/20212* (2013.01); *G06T 2207/30096* (2013.01); *G06V 10/82* (2022.01); *G06V 2201/03* (2022.01)

(58) Field of Classification Search
CPC ........ G06N 3/084; G06N 3/09; G06T 7/0012; G06T 2207/10132; G06T 2207/20081; G06T 2207/20084; G06T 2207/20104; G06T 2207/20212; G06T 2207/30096; G06T 1/00; G06T 5/50; G16H 30/40; G16H 50/20; G16H 50/30; G16H 50/70; A61B 8/14
See application file for complete search history.

(56) References Cited

U.S. PATENT DOCUMENTS

| | | | |
|---|---|---|---|
| 2019/0139213 A1 | 5/2019 | Kurita et al. | |
| 2020/0367853 A1* | 11/2020 | Yoo | A61B 8/085 |
| 2020/0410655 A1 | 12/2020 | Imamura et al. | |
| 2021/0015440 A1 | 1/2021 | Hamauzu | |
| 2021/0398254 A1 | 12/2021 | Oshikawa et al. | |
| 2023/0015933 A1 | 1/2023 | Aoyagi et al. | |

FOREIGN PATENT DOCUMENTS

| | | | |
|---|---|---|---|
| CN | 111192316 B | * 1/2024 | ............... G06T 7/62 |
| JP | 2019087078 | 6/2019 | |
| JP | 2020192006 | 12/2020 | |
| JP | 2021005266 | 1/2021 | |
| JP | 2021013685 | 2/2021 | |
| WO | 2016157499 | 10/2016 | |
| WO | 2020075531 | 4/2020 | |

OTHER PUBLICATIONS

"Written Opinion of the International Searching Authority (Form PCT/ISA/237) of PCT/JP2022/008167," mailed on May 17, 2022, with English translation thereof, pp. 1-8.

Alex Krizhevsky et al., "ImageNet Classification with Deep Convolutional Neural Networks", Communications of the ACM, Jun. 2017, pp. 1-9.

Smruti Mahapatra et al., "Automatic detection of cotton balls during brain surgery: Where deep learning meets ultrasound imaging to tackle foreign objects", Proc SPIE Int Soc Opt Eng, Feb. 2021, pp. 1-15.

"Notice of Reasons for Refusal of Japan Counterpart Application", issued on Sep. 10, 2025, with English translation thereof, pp. 1-8.

* cited by examiner

| IMAGE ID | POSITION OF REGION OF INTEREST | SIZE OF REGION OF INTEREST | TYPE OF REGION OF INTEREST |
|---|---|---|---|
| 001 | T1(X1,Y1) | Z1 px | ORGAN A |
|  | T2(X2,Y2) | Z2 px | ORGAN B |
|  | T3(X3,Y3) | Z3 px | LESION C |
|  | T4(X4,Y4) | Z4 px | LESION D |
| 002 | ⋮ | ⋮ | ⋮ |

| GEOMETRIC-SHAPE ID | GEOMETRIC SHAPE | | MINIMUM VALUE | MAXIMUM VALUE | COMBINATION-ALLOWED REGION |
|---|---|---|---|---|---|
| 001 | ARROW | ⇧ | 032 px | 512 px | ANY REGION |
| 002 | LINE | — | 008 px | 960 px | WITHIN REGION OF INTEREST |
| 003 | RECTANGULAR SHAPE | □ | 064 px | 256 px | ANY REGION |
| 004 | ROUND SHAPE | ○ | 016 px | 256 px | ANY REGION |
| 005 | TRIANGULAR SHAPE | △ | 128 px | 512 px | OTHER THAN REGION OF INTEREST |
| ⋮ | ⋮ | ⋮ | ⋮ | ⋮ | ⋮ |

MACHINE LEARNING SYSTEM, RECOGNIZER, LEARNING METHOD, AND PROGRAM

CROSS-REFERENCE TO RELATED APPLICATIONS

The present application is a Continuation of PCT International Application No. PCT/JP2022/008167 filed on Feb. 28, 2022 claiming priority under 35 U.S.C § 119(a) to Japanese Patent Application No. 2021-031699 filed on Mar. 1, 2021. Each of the above applications is hereby expressly incorporated by reference, in its entirety, into the present application.

BACKGROUND OF THE INVENTION

1. Field of the Invention

The present invention relates to a machine learning system, a recognizer, a learning method, and a program and specifically relates to a machine learning system, a recognizer, a learning method, and a program for medical images on which geometric shapes are superimposed.

2. Description of the Related Art

Recently, highly accurate automatic recognition has been made possible by machine learning using deep learning (A. Krizhevsky, I. Sutskever, and G. Hinton, ImageNet classification with deep convolutional neural networks, In NIPS, 2012). This technique is applied also to an ultrasound diagnostic apparatus, and a recognizer trained with deep learning can be used to recognize and present to a user, various types of information from an ultrasound image.

In deep learning, supervised learning that is learning using learning data and ground truth data indicating a ground truth of the learning data is known.

For example, JP2020-192006A describes a learning data generation system that generates learning data used in machine learning.

SUMMARY OF THE INVENTION

For a medical image (for example, an ultrasound image), a technique is being studied in which machine learning for a recognizer is performed by using, for example, ground truth data having information about the positions and types of organs and the recognizer for which machine learning has been performed is used as a recognizer to present the position and type of an organ to a user.

Regarding medical images, specifically ultrasound images, a geometric shape specified by a user is often superimposed on an obtained medical image and displayed. Examples of a geometric shape specified by a user include a rectangular shape that encloses the position of an organ present in the medical image, an arrow, a round shape, and a triangular shape that indicate a region of interest, and a line that indicates the length of an organ present in the medical image.

When machine learning is performed for a recognizer by using as learning data, combined medical images on which geometric shapes are superimposed as described above, the recognizer may regard and learn the geometric shapes as features and might not be able to appropriately recognize a medical image without a geometric shape. When machine learning is performed for a recognizer by using as learning data, medical images not combined with geometric shapes, the recognizer might not be able to appropriately recognize a medical image combined with a geometric shape because learning of medical images combined with geometric shapes is not performed.

To increase the accuracy of recognition of a medical image combined with a geometric shape, the recognizer needs to learn by using a large volume of learning data, that geometric shapes have no relation to recognition targets in medical images.

However, preparation of a large number of medical images that are necessary for machine learning and that are combined with various geometric shapes is troublesome, takes time, and is not easy.

In the technique described in JP2020-192006A, the use of a combined image as learning data for a recognizer that recognizes a region of interest and its type in the image is not mentioned.

The present invention has been made in view of the above-described circumstances, and an object thereof is to provide a machine learning system, a learning method, and a program that can facilitate learning of a large number of combined medical images.

To achieve the above-described object, a machine learning system according to an aspect of the present invention is a machine learning system including: an image database that stores a plurality of medical images; a geometric-shape database that stores geometric shapes to be superimposed on the medical images; a processor; and a learning model, in which the processor is configured to perform a selection accepting process of accepting selection of a medical image from among the medical images stored in the image database and selection of a geometric shape from among the geometric shapes stored in the geometric-shape database, a geometric-shape combining process of combining the selected medical image and the selected geometric shape and generating a composite image, and a training process of making the learning model perform learning by using the composite image.

According to this aspect, a medical image stored in the image database and a geometric shape stored in the geometric-shape database are selected, and a composite image is generated from the medical image and the geometric shape. In this aspect, the composite image is used to train the learning model, and therefore, the learning model can be made to learn a large number of combined medical images more efficiently and easily.

Preferably, in the training process, the medical image accepted in the selection accepting process is used at least twice, and the learning model is made to perform learning by first using the medical image for which the geometric-shape combining process has not been performed and by next using the composite image for which the geometric-shape combining process has been performed.

According to this aspect, the medical image for which the geometric-shape combining process has not been performed and the composite image for which the geometric-shape combining process has been performed are used to train the learning model, and therefore, the learning model can be made to perform learning more efficiently.

Preferably, the processor is configured to perform a size accepting process of accepting a size of the geometric shape that is combined in the geometric-shape combining process, and in the geometric-shape combining process, the geometric shape is combined with the medical image on the basis of the size accepted in the size accepting process.

Preferably, the geometric-shape database stores in association with each geometric shape of the geometric shapes, at least one of information about a combination-allowed region in the medical images or maximum and minimum values of a size of the geometric shape.

Preferably, the image database stores in association with each of the medical images, information about a region of interest, and in the geometric-shape combining process, the geometric shape is combined such that at least a portion of the geometric shape is superimposed on the region of interest, by using the information about the region of interest.

According to this aspect, the geometric shape is combined so as to be superimposed on the region of interest, and therefore, a distinction between the geometric shape and the region of interest can be appropriately learned to make the learning model efficiently recognize the region of interest.

Preferably, the image database stores in association with each of the medical images, information about a region of interest, and in the geometric-shape combining process, the geometric shape is combined in a region outside the region of interest, by using the information about the region of interest.

According to this aspect, the geometric shape is combined in a region outside the region of interest, and therefore, a distinction between the geometric shape and the region of interest can be appropriately learned to make the learning model efficiently recognize the region of interest (and its type).

Preferably, in the geometric-shape combining process, a plurality of composite images are generated by changing a position and a size of the selected geometric shape, and in the training process, the learning model is made to perform learning by using the plurality of composite images.

According to this aspect, a plurality of composite images are generated by changing the position and size of the geometric shape, and therefore, the composite images can be generated more efficiently and easily.

Preferably, the medical images are images obtained from an ultrasound diagnostic apparatus.

A recognizer according to another aspect of the present invention is trained in the machine learning system described above and recognizes a region of interest from a medical image to which a geometric shape is added.

A learning method according to another aspect of the present invention is a learning method using a machine learning system including: an image database that stores a plurality of medical images; a geometric-shape database that stores geometric shapes to be superimposed on the medical images; a processor; and a learning model, in which the processor is configured to perform a selection accepting step of accepting selection of a medical image from among the medical images stored in the image database and selection of a geometric shape from among the geometric shapes stored in the geometric-shape database, a geometric-shape combining step of combining the selected medical image and the selected geometric shape and generating a composite image, and a training step of making the learning model perform learning by using the composite image.

A program according to another aspect of the present invention is a program for performing a learning method using a machine learning system including: an image database that stores a plurality of medical images; a geometric-shape database that stores geometric shapes to be superimposed on the medical images; a processor; and a learning model, in which the program causes the processor to perform a selection accepting step of accepting selection of a medical image from among the medical images stored in the image database and selection of a geometric shape from among the geometric shapes stored in the geometric-shape database, a geometric-shape combining step of combining the selected medical image and the selected geometric shape and generating a composite image, and a training step of making the learning model perform learning by using the composite image.

According to the present invention, a medical image stored in the image database and a geometric shape stored in the geometric-shape database are selected, a composite image is generated from the medical image and the geometric shape, and the composite image is used to train the learning model, and therefore, a large number of combined medical images can be learned more efficiently and easily.

DESCRIPTION OF THE PREFERRED EMBODIMENTS

Hereinafter, preferred embodiments of a machine learning system, a recognizer, a learning method, and a program according to the present invention will be described with reference to the attached drawings.

First Embodiment

Figure 1:
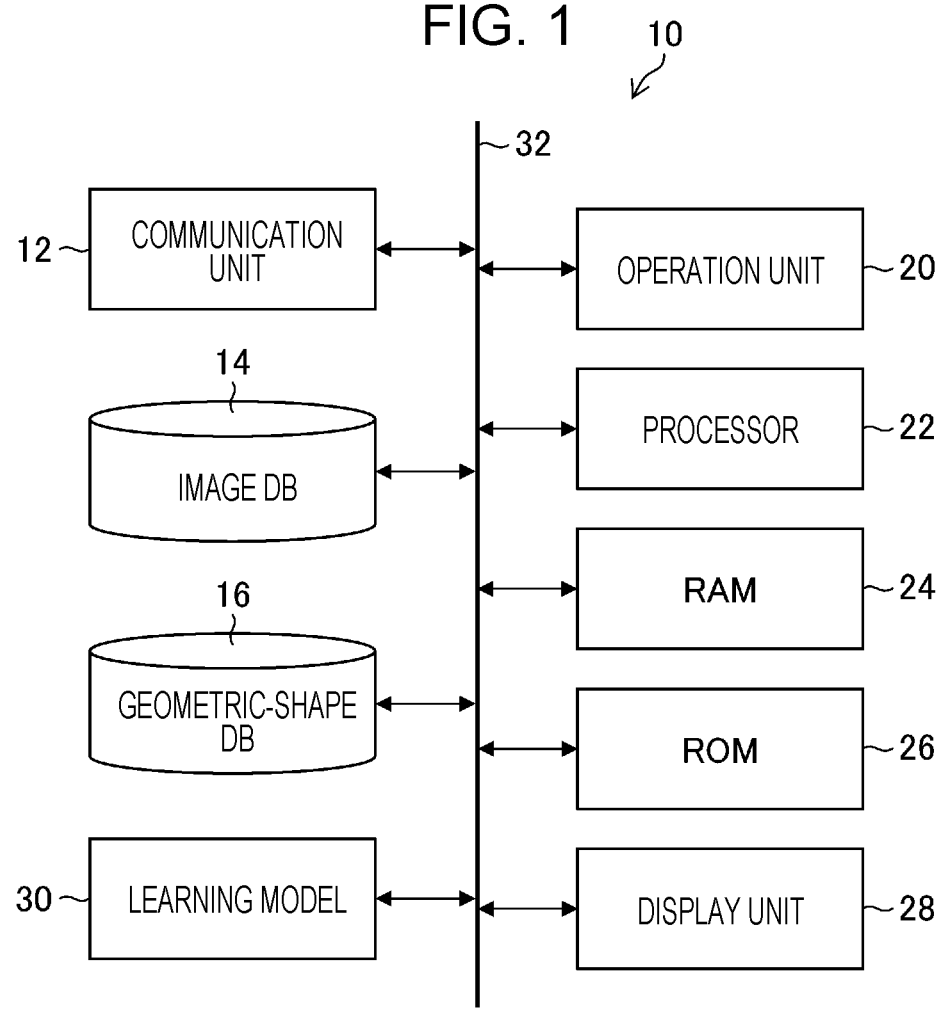
FIG. 1 is a block diagram illustrating an example configuration of a machine learning system.

FIG. 1 is a block diagram illustrating an example configuration of a machine learning system in this embodiment.

A machine learning system 10 is implemented as a personal computer or a workstation. The machine learning system 10 is constituted by a communication unit 12, an image database (indicated as "image DB" in FIG. 1) 14, a geometric-shape database (indicated as "geometric-shape DB" in FIG. 1) 16, an operation unit 20, a processor 22, a RAM (random access memory) 24, a ROM (read-only memory) 26, a display unit 28, and a learning model 30. These units are connected to each other via a bus 32. Although an example where the units are connected to the bus 32 has been described here, the machine learning system 10 is not limited to this example. For example, some or all of the units in the machine learning system may be connected to each other via a network. Examples of the network include various communication networks, such as a LAN (local area network), a WAN (wide area network), and the Internet. Although a description of, for example, the machine learning system 10 will be given below, the present invention is applicable also to a machine learning apparatus.

The communication unit 12 is an interface that performs processing for communication with an external apparatus by wire or wirelessly and that exchanges information with the external apparatus.

The ROM 26 permanently retains programs including a boot program and a BIOS (Basic Input/Output System) of the computer, data, and so on. The RAM 24 temporarily retains a program, data, and so on loaded from the ROM 26, a separately connected storage device, or the like and includes a work area used by the processor 22 for performing various processes.

The operation unit 20 is an input interface that accepts various operations input to the machine learning system 10. As the operation unit 20, a keyboard, a mouse, or the like connected to the computer by wire or wirelessly is used.

The processor 22 is implemented as a CPU (central processing unit). The processor 22 reads various programs stored in the ROM 26, a hard disk apparatus not illustrated, or the like and performs various processes. The RAM 24 is used as a work area of the processor 22. The RAM 24 is used as a storage unit that temporarily stores a read program and various types of data. The machine learning system 10 may include a GPU (graphics processing unit) instead of the processor 22.

The display unit 28 is an output interface on which necessary information in the machine learning system 10 is displayed. As the display unit 28, a liquid crystal monitor or any of various monitors that can be connected to the computer is used.

The image database 14 is a database that stores a plurality of medical images. The medical images are, for example, ultrasound images obtained by an ultrasonic endoscope system described below.

The geometric-shape database 16 is a database that stores a plurality of types of geometric shapes. The geometric shapes are used to, for example, assist a doctor in diagnosing (or observing) a region of interest during an observation of an ultrasound image.

The image database 14 and the geometric-shape database 16 are implemented as a recording medium or a cloud. The image database 14 and the geometric-shape database 16 will be described in detail below.

The learning model 30 is implemented as a CNN (convolutional neural network) for which machine learning is performed so as to recognize the position of a region of interest and the type of region of interest from a medical image. In response to input of a medical image, the learning model 30 outputs at least one of the position of a region of interest or the type of region of interest as an estimation result. The learning model 30 included in the machine learning system 10 is an untrained model, and the machine learning system 10 makes the learning model 30 perform machine learning for estimating the position of a region of interest and the type of region of interest. Here, a region of interest is, for example, an organ or a lesion and is a region to which a doctor pays attention during an observation of a medical image. The type of region of interest is specifically an organ name, a lesion name, a lesion level, or the like and is the classification of region of interest.

Although an example where the machine learning system 10 is implemented as a single personal computer or workstation has been described above, the machine learning system 10 may be implemented as a plurality of personal computers.

Figure 2:
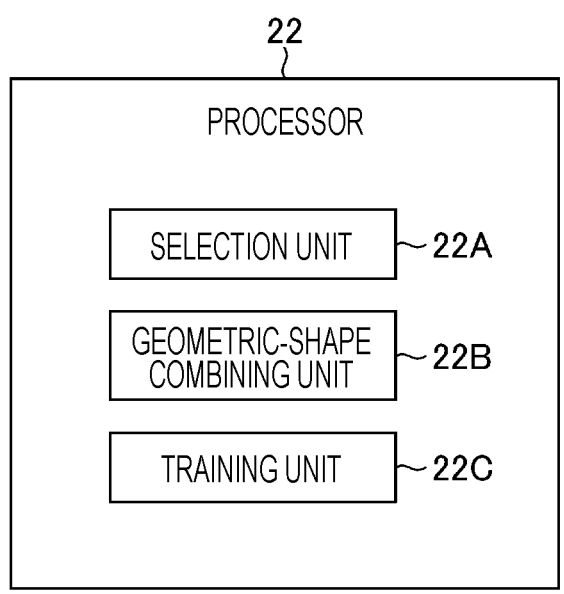
FIG. 2 is a block diagram illustrating main functions implemented by a processor in the machine learning system.

FIG. 2 is a block diagram illustrating main functions implemented by the processor 22 in the machine learning system 10.

The processor 22 mainly includes a selection unit 22A, a geometric-shape combining unit 22B, and a training unit 22C.

The selection unit 22A performs a selection accepting process and accepts selection of a medical image stored in the image database 14. The selection unit 22A accepts selection of a geometric shape stored in the geometric-shape database 16. For example, a user selects a medical image stored in the image database 14 and a geometric shape stored in the geometric-shape database 16 by using the operation unit 20, and the selection unit 22A accepts the selection. The selection unit 22A performs a size accepting process and accepts a size of the geometric shape that is combined in a geometric-shape combining process. For example, when accepting selection of a geometric shape, the selection unit 22A also accepts selection of a size of the geometric shape that is combined.

The geometric-shape combining unit 22B performs the geometric-shape combining process and combines the selected medical image and geometric shape to generate a composite image. The geometric-shape combining unit 22B superimposes the geometric shape on the medical image in various forms to generate a composite image. For example, the geometric-shape combining unit 22B can combine the geometric shape so as to be superimposed on a region of interest in the medical image to thereby generate a composite image. The geometric-shape combining unit 22B can combine the geometric shape so as to be superimposed on a region outside a region of interest in the medical image to thereby generate a composite image. The geometric-shape combining unit 22B can superimpose and combine the geometric shape regardless of a region of interest in the medical image (that is, at random). The geometric-shape combining unit 22B can determine a position at which the geometric shape is to be superimposed, by using, for example, a random number table and superimpose and combine the geometric shape with the medical image at random. When a size of the geometric shape is accepted by the selection unit 22A, the geometric shape is combined with the medical image on the basis of the size accepted in the size accepting process.

The geometric-shape combining unit 22B may generate a plurality of composite images by changing the position and size of the selected geometric shape. That is, the geometric-shape combining unit 22B may generate a plurality of variations of composite images by changing a position in the medical image at which the selected geometric shape is superimposed and the size of the selected geometric shape. This facilitates generation of a larger volume of learning data. The geometric-shape combining unit 22B determines a combination form of a composite image as specified by the user or automatically and generates the composite image.

The training unit 22C performs a training process and makes the learning model 30 perform learning by using a composite image. Specifically, the training unit 22C optimizes parameters of the learning model 30 on the basis of an error (difference) between an estimation result output from the learning model 30 in response to input of the composite image and ground truth data. The training unit 22C will be described in detail below.

Figure 3:
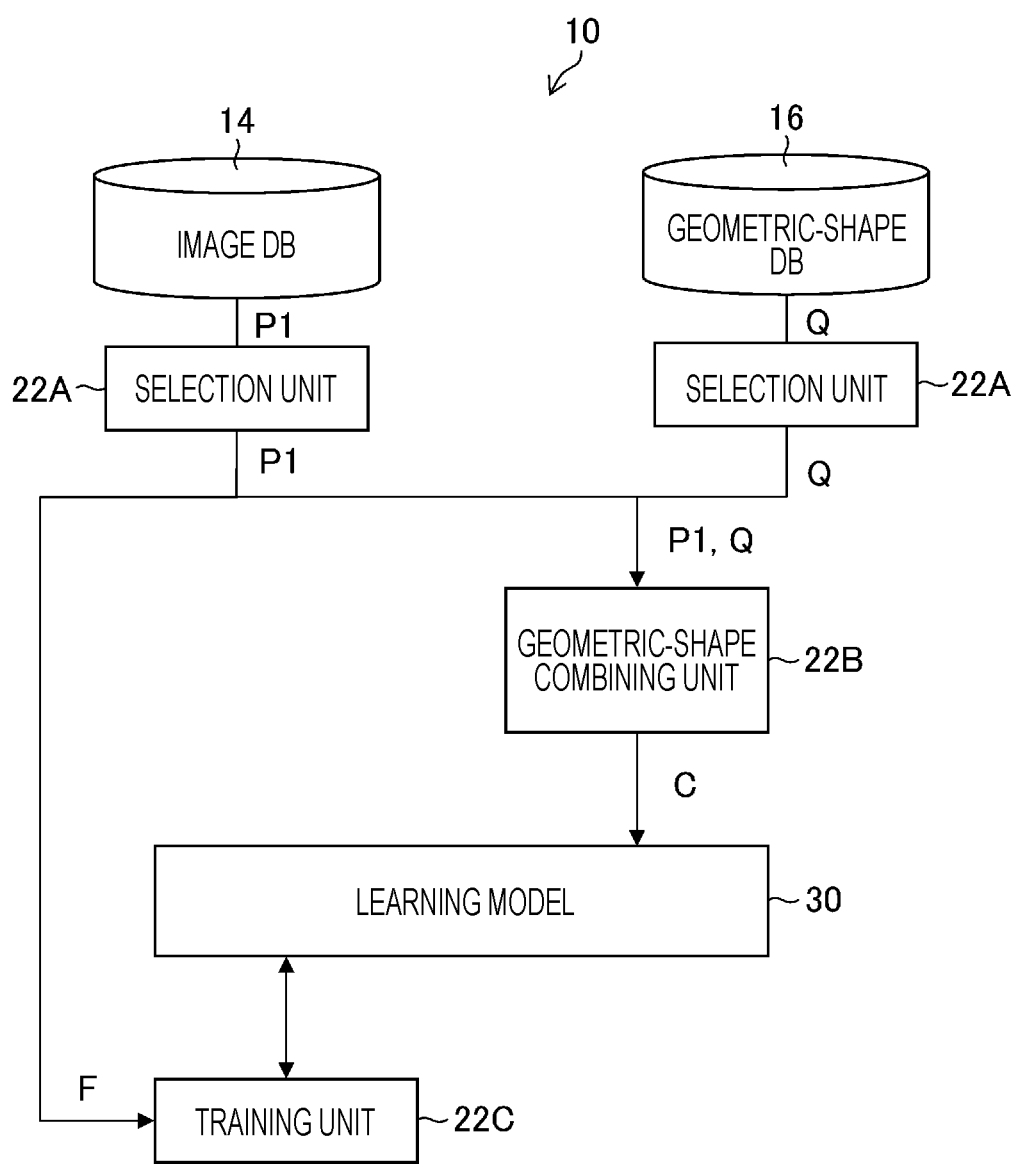
FIG. 3 is a diagram for explaining a specific flow of data in the machine learning system.

FIG. 3 is a diagram for explaining a specific flow of data in the machine learning system 10. In the following description, a case where an ultrasound image is used as an example of the medical image will be described.

The selection unit 22A selects an ultrasound image P1 from the image database 14 in accordance with selection by the user. For example, the user selects the ultrasound image P1 by using the operation unit 20. The selection unit 22A selects one or more geometric shapes Q from the geometric-shape database 16 in accordance with selection by the user. Specific examples of the image database 14 and the geometric-shape database 16 will be described below.

Figures 4, 5:
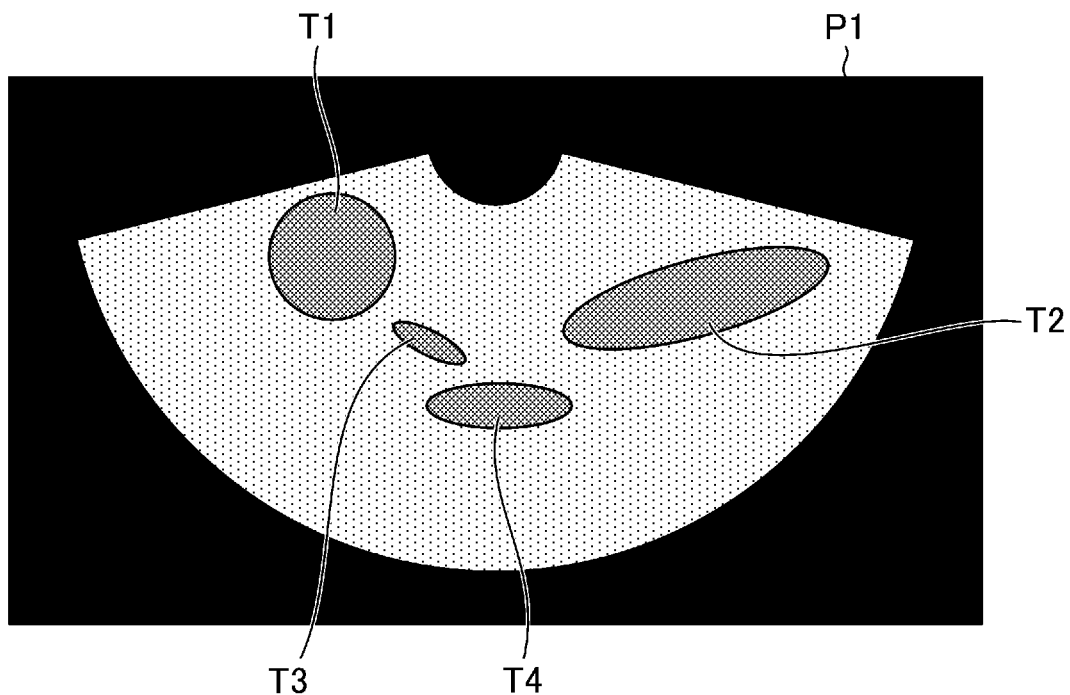
FIG. 4 is a diagram illustrating an example ultrasound image.
FIG. 5 is a diagram illustrating a specific example of the storage configuration of an image database.

FIG. 4 is a diagram illustrating an example of the ultrasound image P1 stored in the image database 14.

The ultrasound image P1 has regions of interest in each of which an organ or a lesion is present. Specifically, the ultrasound image P1 has a region of interest T1, a region of interest T2, a region of interest T3, and a region of interest T4. The region of interest T1 corresponds to an image of an organ A, the region of interest T2 corresponds to an image of an organ B, the region of interest T3 corresponds to an image of a lesion C, and the region of interest T4 corresponds to an image of a lesion D.

FIG. 5 is a diagram illustrating a specific example of the storage configuration of the image database 14.

The image database 14 stores a plurality of ultrasound images P. Each of the ultrasound images P is assigned an image ID. The image ID of the ultrasound image P1 is 001. In the image database 14, the position of each of the regions of interest T1 to T4 in the ultrasound image P1 is stored as X-Y coordinates in association with the image ID of the ultrasound image P1. The size of each of the regions of interest T1 to T4 is stored as the number of pixels. Further, the type of each of the regions of interest T1 to T4 is indicated. Some or all of the position of a region of interest, the size of the region of interest, and the type of the region of interest thus stored in the image database 14 in association with the image ID are made to correspond to an estimation result output from the learning model 30 described below and are used as ground truth data F in machine learning. Although omitted in FIG. 5, a plurality of ultrasound images P other than the ultrasound image P1 are similarly stored in the image database 14.

Figures 6, 7:
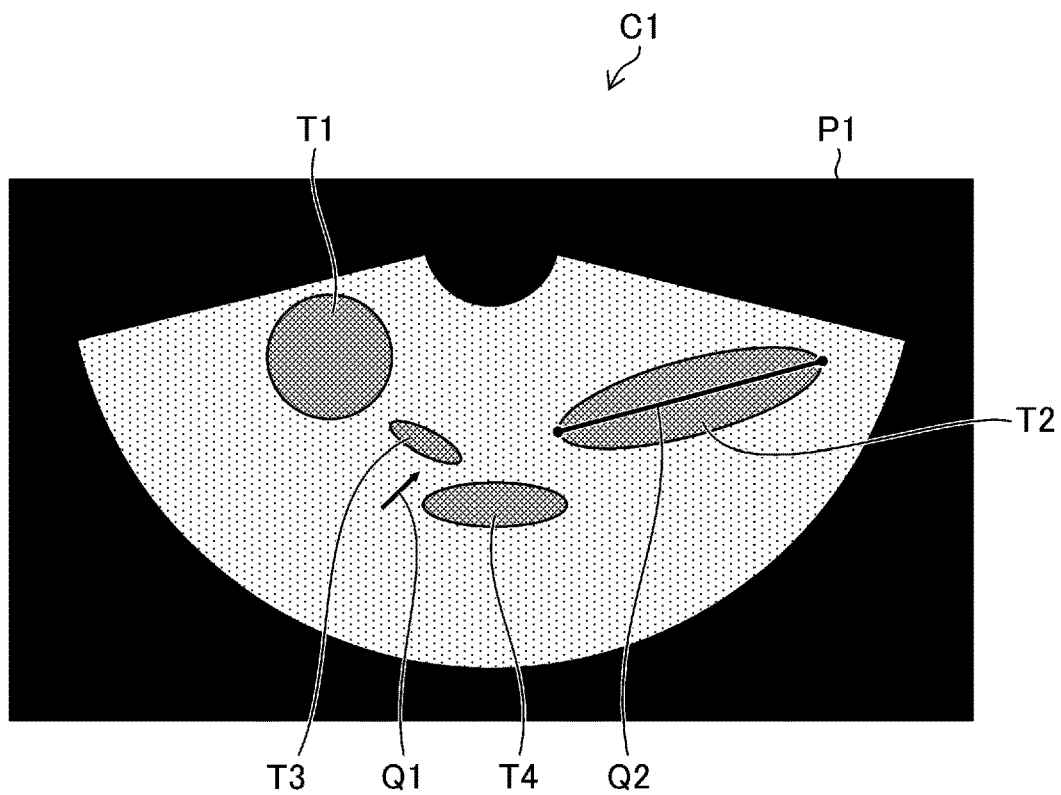
FIG. 6 is a diagram illustrating a specific example of the storage configuration of a geometric-shape database.
FIG. 7 is a diagram illustrating an example composite image for which combining has been performed by a geometric-shape combining unit.

FIG. 6 is a diagram illustrating a specific example of the storage configuration of the geometric-shape database 16.

As illustrated in FIG. 6, in the geometric-shape database 16, a geometric-shape ID, a geometric shape, the minimum value of the geometric shape, the maximum value of the geometric shape, and a combination-allowed region are registered in association with each other. Specifically, the geometric-shape ID of an arrow is 001, the minimum value of the geometric shape is 32 px, the maximum value of the geometric shape is 512 px, and the combination-allowed region is any region in the ultrasound image. The geometric-shape ID of a line is 002, the minimum value of the geometric shape is 8 px, the maximum value of the geometric shape is 960 px, and the combination-allowed region is a region within a region of interest in the ultrasound image. The geometric-shape ID of a rectangular shape is 003, the minimum value of the geometric shape is 64 px, the maximum value of the geometric shape is 256 px, and the combination-allowed region is any region. The geometric-shape ID of a round shape is 004, the minimum value of the geometric shape is 16 px, the maximum value of the geometric shape is 256 px, and the combination-allowed region is any region. The geometric-shape ID of a triangular shape is 005, the minimum value of the geometric shape is 128 px, the maximum value of the geometric shape is 512 px, and the combination-allowed region is a region other than a region of interest. The geometric-shape database 16 stores geometric shapes other than the above-described geometric shapes.

Referring back to FIG. 3, the ultrasound image P1 and the geometric shapes Q selected by the selection unit 22A are input to the geometric-shape combining unit 22B. The geometric-shape combining unit 22B generates a composite image C from the ultrasound image P1 and the geometric shapes Q. Specific examples of the composite image C will be described below.

FIG. 7 to FIG. 10 are diagrams illustrating example composite images for which combining has been performed by the geometric-shape combining unit 22B.

In the example illustrated in FIG. 7, the ultrasound image P1, a geometric shape (arrow) Q1, and a geometric shape (line) Q2 are selected and combined to thereby generate a composite image C1.

In the composite image C1, the geometric shape Q1 is superimposed on a vicinity of the region of interest T3 so as to point to the region of interest, on the basis of information (X3, Y3) about the position of the region of interest T3 and/or information (Z3 px) about the size of the region of interest. In the composite image C1, the geometric shape Q2 is superimposed so as to indicate both end portions of the region of interest T2, on the basis of information (X2, Y2) about the position of the region of interest T2 and/or information (Z2 px) about the size of the region of interest. Accordingly, the geometric shape Q1 and the geometric shape Q2 are superimposed on the ultrasound image P1 and the composite image C1 is generated as in a case where a doctor actually observes the ultrasound image P1 and adds geometric shapes.

Figure 8:
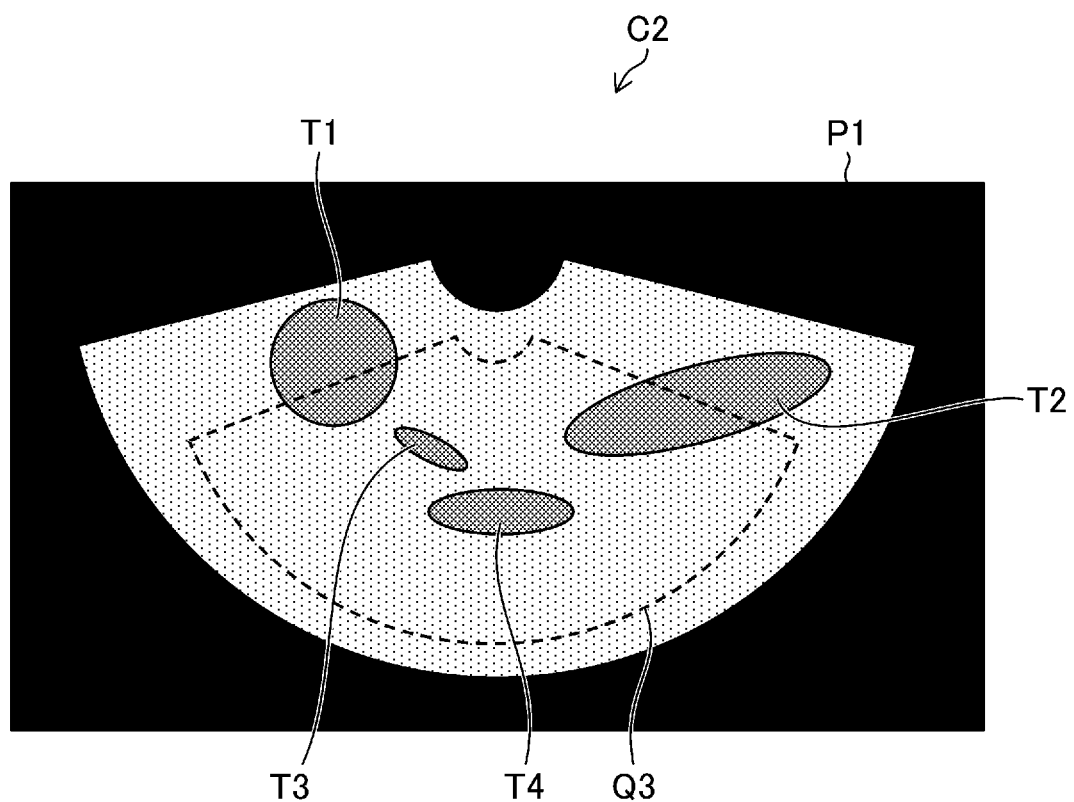
FIG. 8 is a diagram illustrating an example composite image for which combining has been performed by the geometric-shape combining unit.

In the example illustrated in FIG. 8, the ultrasound image P1 and a geometric shape (rectangular shape) Q3 are selected and combined to thereby generate a composite image C2.

In the composite image C2, the geometric shape Q3 is superimposed such that the regions of interest T3 and T4 are enclosed in the rectangular shape, on the basis of information (see FIG. 5) about the positions and/or sizes of the regions of interest T1 to T4, and portions of the geometric shape Q3 cross the region of interest T1 and the region of interest T2. Accordingly, the composite image C2 obtained by superimposing the geometric shape Q3 on the ultrasound image P1 is generated as in a case where a doctor observes the regions of interest T3 and T4 and adds an assisting geometric shape.

Figure 9:
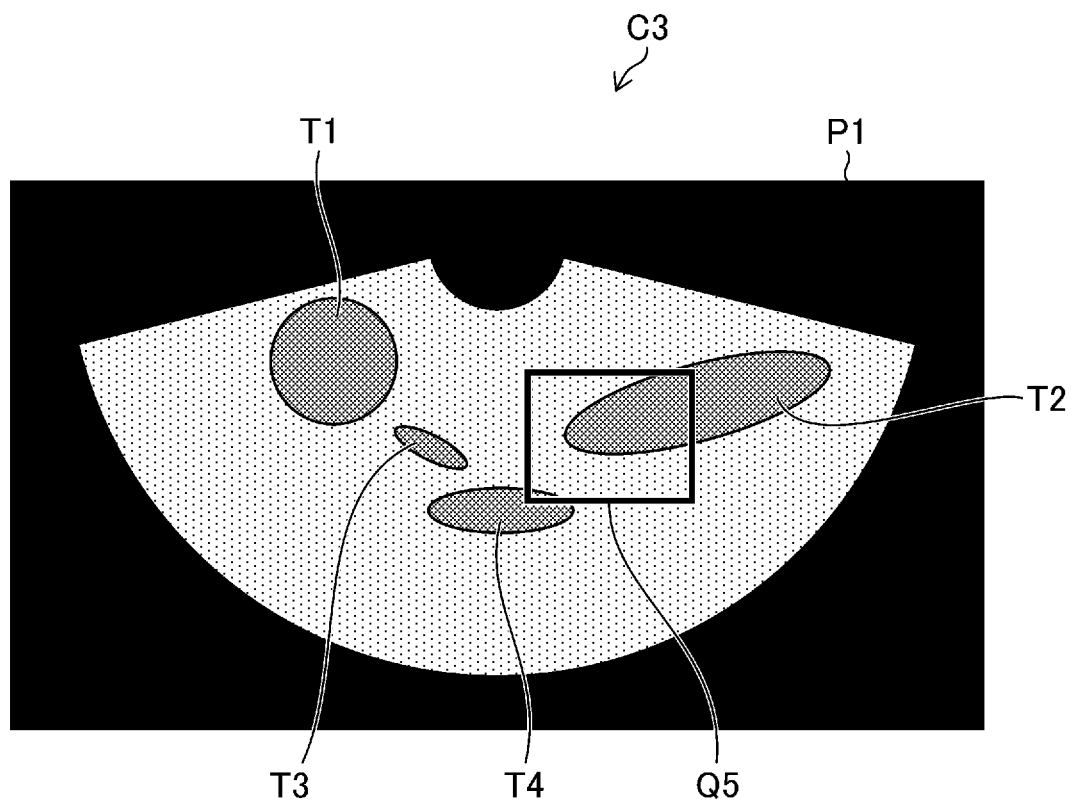
FIG. 9 is a diagram illustrating an example composite image for which combining has been performed by the geometric-shape combining unit.

In the example illustrated in FIG. 9, the ultrasound image P1 and a geometric shape (rectangular shape) Q5 are selected and combined to thereby generate a composite image C3.

In the composite image C3, a superimposition position is determined by using, for example, a random number table and the geometric shape Q5 is superimposed at random. In a case where a doctor actually adds a geometric shape to an ultrasound image, the doctor points to a region of interest (for example, encloses the region of interest with a rectangular shape or points to the region of interest with an arrow), however, in the case illustrated in FIG. 9, the geometric shape Q5 is superimposed regardless of the regions of interest T1 to T4. That is, the geometric shape Q5 is superimposed on the ultrasound image P1 in a form different from a form in which the doctor adds a geometric shape (that is, regardless of the positions of the regions of interest). The use of the composite image C3 as described above as learning data can also allow effective recognition of regions of interest.

Figure 10:
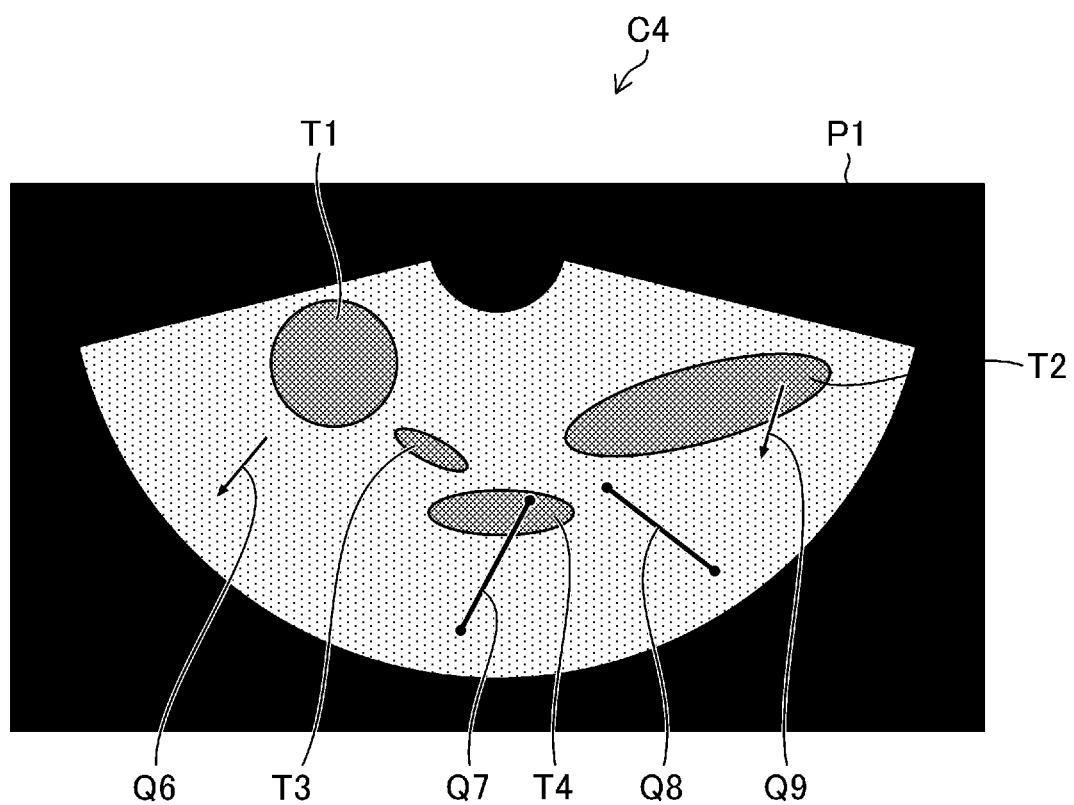
FIG. 10 is a diagram illustrating an example composite image for which combining has been performed by the geometric-shape combining unit.

In the example illustrated in FIG. 10, the ultrasound image P1, a geometric shape (arrow) Q6, a geometric shape (line) Q7, a geometric shape (line) Q8, and a geometric shape (arrow) Q9 are selected and combined to thereby generate a composite image C4.

In the composite image C4, the geometric shape Q6 and the geometric shape Q8 are superimposed on a region outside the regions of interest T1 to T4 on the basis of information (see FIG. 5) about the positions and/or sizes of the regions of interest T1 to T4. In the composite image C4, the geometric shape Q7 and the geometric shape Q9 are placed at random. Accordingly, in the composite image C4, the geometric shapes Q6 to Q9 are superimposed at random and the geometric shapes Q6 to Q9 are superimposed on the ultrasound image P1 in a form different from a form in a case where a doctor adds geometric shapes to the ultrasound image (that is, regardless of the positions of the regions of interest). The use of the composite image C4 as described above as learning data can also allow effective recognition of regions of interest.

Referring back to FIG. 3, the composite image C combined by the geometric-shape combining unit 22B is input to the learning model 30. The positions of the regions of interest and the types of regions of interest in the ultrasound image P1 selected by the selection unit 22A are input to the training unit 22C as the ground truth data F. Machine learning for the learning model 30 performed by the training unit 22C will be described below.

Figure 11:
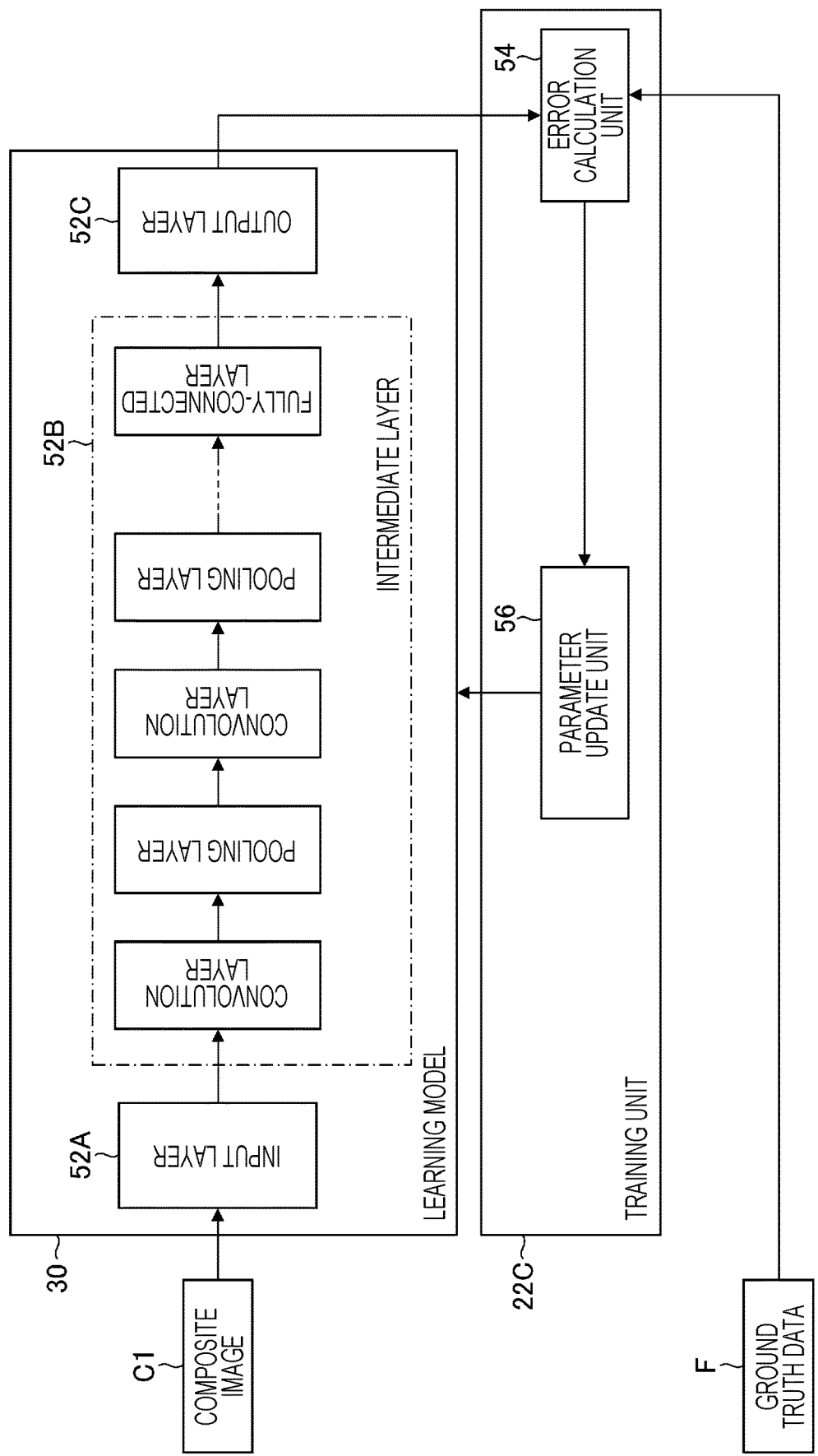
FIG. 11 is a functional block diagram illustrating main functions of a training unit and a learning model.

FIG. 11 is a functional block diagram illustrating main functions of the training unit 22C and the learning model 30. The training unit 22C includes an error calculation unit 54 and a parameter update unit 56. To the training unit 22C, the ground truth data F is input.

The learning model 30 is a recognizer that recognizes the positions of regions of interest and the types of regions of interest in the ultrasound images P by image recognition. The learning model 30 has a multilayer structure and retains a plurality of weight parameters. When the weight parameters are updated from initial values to optimum values, the learning model 30 changes from an untrained model to a trained model.

The learning model 30 includes an input layer 52A, an intermediate layer 52B, and an output layer 52C. The input layer 52A, the intermediate layer 52B, and the output layer 52C each have a structure in which a plurality of "nodes" are connected by "edges". To the input layer 52A, the composite image C that is a learning target is input.

The intermediate layer 52B is a layer in which features are extracted from the image input from the input layer 52A. The intermediate layer 52B has a plurality of sets each formed of a convolution layer and a pooling layer and a fully-connected layer. The convolution layer performs for a nearby node in the preceding layer, a convolution operation using a filter to obtain a feature map. The pooling layer reduces the feature map output from the convolution layer to obtain a new feature map. The fully-connected layer connects all nodes in the immediately preceding layer (here, the pooling layer). The convolution layer assumes the role of feature extraction such as extraction of edges from an image, and the pooling layer assumes the role of providing robustness such that extracted features are not affected by, for example, translation. The intermediate layer 52B need not include the convolution layer and the pooling layer as one set and may include successive convolution layers or include a normalization layer.

The output layer 52C is a layer that outputs the results of recognition of the positions and types of regions of interest in the ultrasound images P on the basis of the features extracted by the intermediate layer 52B.

The learning model 30 that has been trained outputs the results of recognition of the positions and types of regions of interest.

For a coefficient and an offset value of the filter applied to each convolution layer of the learning model 30 before training and for the weight of a connection in the fully-connected layer with the next layer, desired initial values are set.

The error calculation unit 54 obtains the results of recognition output from the output layer 52C of the learning model 30 and the ground truth data F for the input image and calculates the errors (differences) between the results of recognition and the ground truth data F. As the method of calculating the errors, a method using, for example, softmax cross-entropy or Mean Squared Error (MSE) can be used. The ground truth data F for the input image (composite image C1) is, for example, data indicating the positions and types of the regions of interest T1 to T4.

The parameter update unit 56 adjusts the weight parameters of the learning model 30 on the basis of the errors calculated by the error calculation unit 54 by using backpropagation.

This process of adjusting the parameters is repeatedly performed and training is repeatedly performed until the difference between the output of the learning model 30 and the ground truth data F becomes small.

The training unit 22C uses at least a dataset of the composite image C1 and the ground truth data F and optimizes each parameter of the learning model 30. Training by the training unit 22C may be performed with a mini-batch method in which a specific number of datasets are extracted and the extracted datasets are used to perform a batch process of training.

A learning method performed by using the machine learning system 10 will be described. Each of the steps of the learning method is performed by the processor 22 executing a program.

Figure 12:
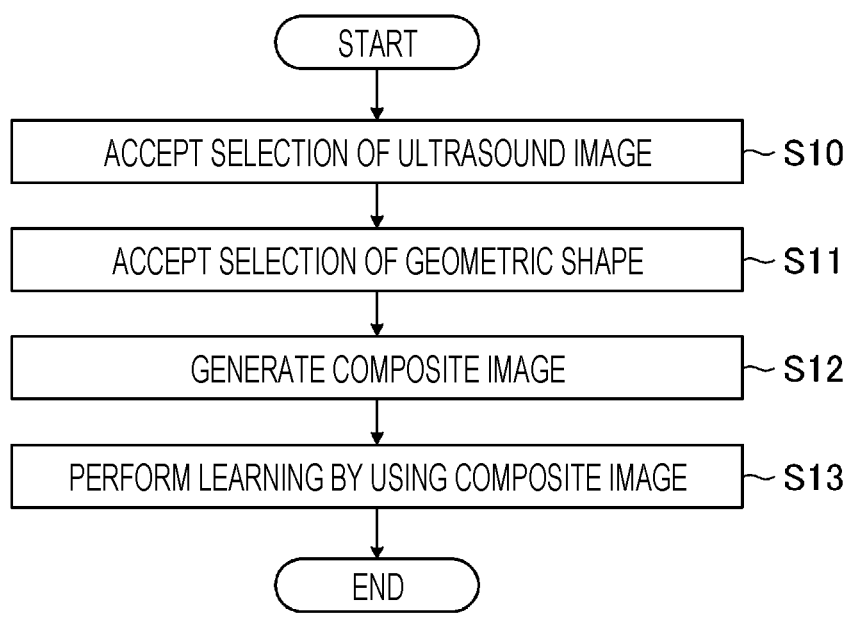
FIG. 12 is a flowchart for explaining a learning method performed by using the machine learning system.

FIG. 12 is a flowchart for explaining the learning method performed by using the machine learning system 10.

First, the selection unit 22A accepts selection of an ultrasound image (medical image) (selection accepting step: step S10). For example, a user confirms ultrasound images displayed on the display unit 28 and selects an ultrasound image by using the operation unit 20. Next, the selection unit 22A accepts selection of a geometric shape (selection step:

step S11). For example, the user confirms geometric shapes displayed on the display unit 28 and selects a geometric shape by using the operation unit 20. Here, the size of the selected geometric shape may be selected and the geometric shape may be superimposed and combined on the basis of the selected size. Thereafter, the geometric-shape combining unit 22B combines the selected ultrasound image and the selected geometric shape and generates a composite image (geometric-shape combining step: step S12). Thereafter, the training unit 22C makes the learning model 30 perform machine learning by using the composite image (training step: step S13).

As described above, in this embodiment, a medical image stored in the image database 14 and a geometric shape stored in the geometric-shape database 16 are selected, and a composite image is generated from the medical image and the geometric shape. In this embodiment, the composite image is used to train the learning model 30, and therefore, the learning model 30 can be made to learn a large number of combined medical images efficiently and easily.

Second Embodiment

A second embodiment will be described. In this embodiment, a selected ultrasound image is used in machine learning at least twice. In this embodiment, for example, an ultrasound image not combined with a geometric shape is used first and the ultrasound image combined with a geometric shape is used next in machine learning.

Figure 13:
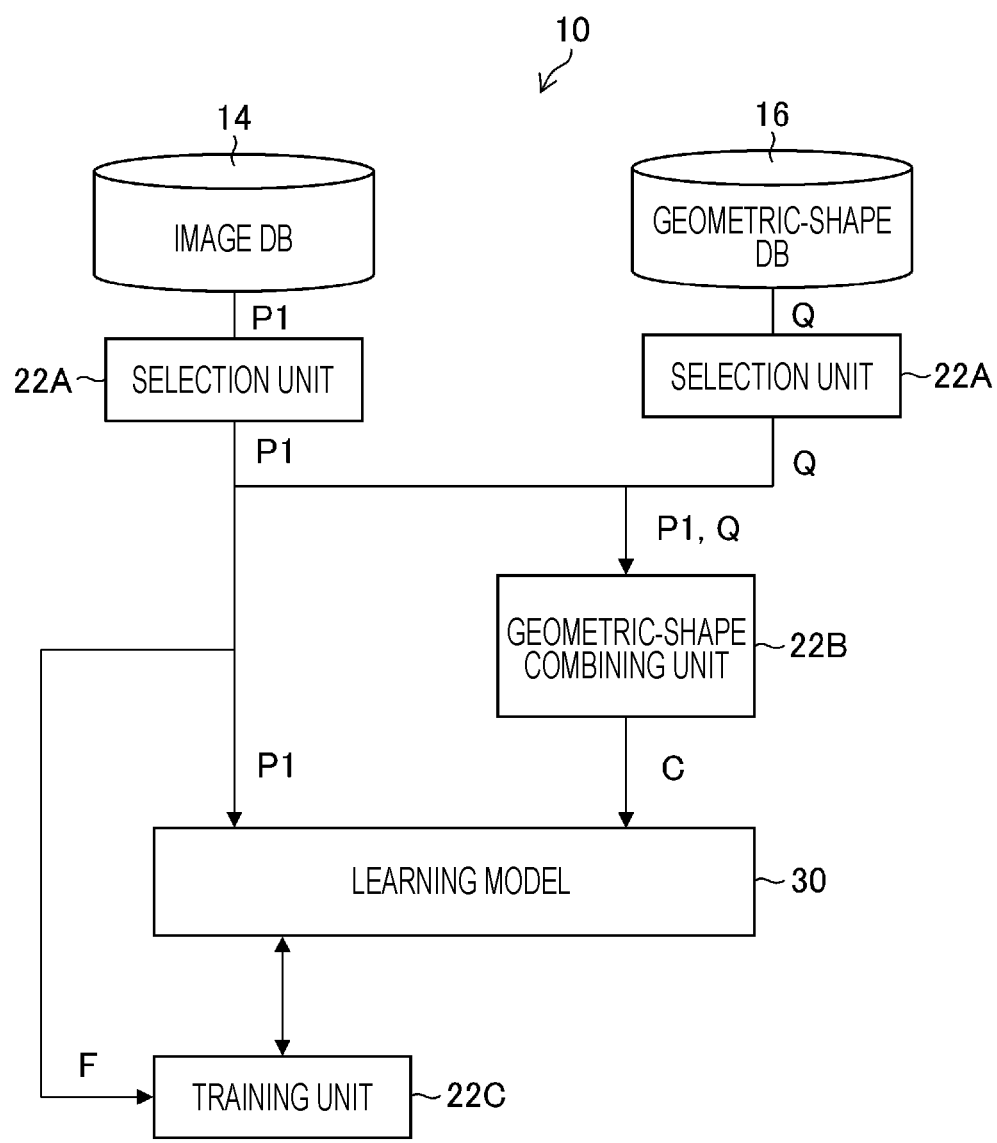
FIG. 13 is a diagram for explaining a specific flow of data in the machine learning system in a second embodiment.

FIG. 13 is a diagram for explaining a specific flow of data in the machine learning system 10 in this embodiment. Note that a part for which a description has been given with reference to FIG. 3 is assigned the same reference numeral and a description thereof is omitted.

In the machine learning system 10 in this embodiment, the composite image C and the ultrasound image P1 are input to the learning model 30. The learning model 30 outputs an estimation result for each of the input images. Specifically, the learning model 30 outputs an estimation result in response to input of the composite image C and outputs an estimation result in response to input of the ultrasound image P1.

Figure 14:
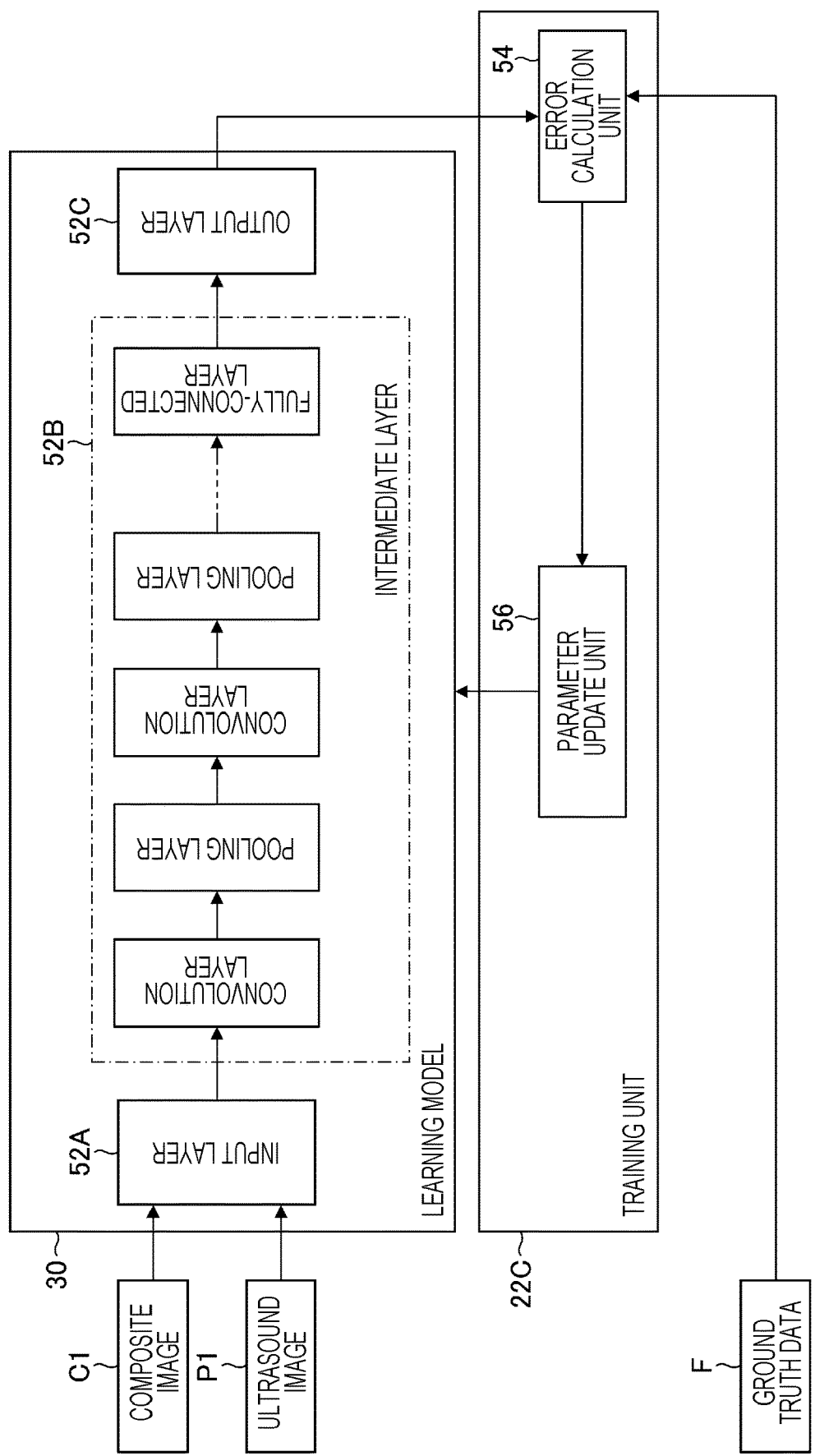
FIG. 14 is a functional block diagram illustrating main functions of the training unit and the learning model.

FIG. 14 is a functional block diagram illustrating main functions of the training unit 22C and the learning model 30 in this embodiment. Note that a part for which a description has been given with reference to FIG. 11 is assigned the same reference numeral and a description thereof is omitted.

In this embodiment, the composite image C1 and the ultrasound image P1 are used to perform machine learning.

Specifically, the composite image C1 and the ultrasound image P1 are input to the input layer 52A. In response to input of the composite image C1, the learning model 30 outputs estimation results for the composite image C1. In response to input of the ultrasound image P1, the learning model 30 outputs estimation results for the ultrasound image P1. The errors (differences) between the estimation results and the ground truth data F are calculated, and the parameters are updated by the parameter update unit 56 on the basis of the errors. Next, the ultrasound image P1 is input to the learning model 30, and the positions, types, and so on of the regions of interest are estimated and output from the output layer 52C. The errors (differences) between the estimation results and the ground truth data F are calculated, and the parameters are updated by the parameter update unit 56 on the basis of the errors. The ground truth data F is data indicating the positions and types of the regions of interest in the ultrasound image P1, and therefore, can be used in common in machine learning of the composite image C1 and the ultrasound image P1.

Figure 15:
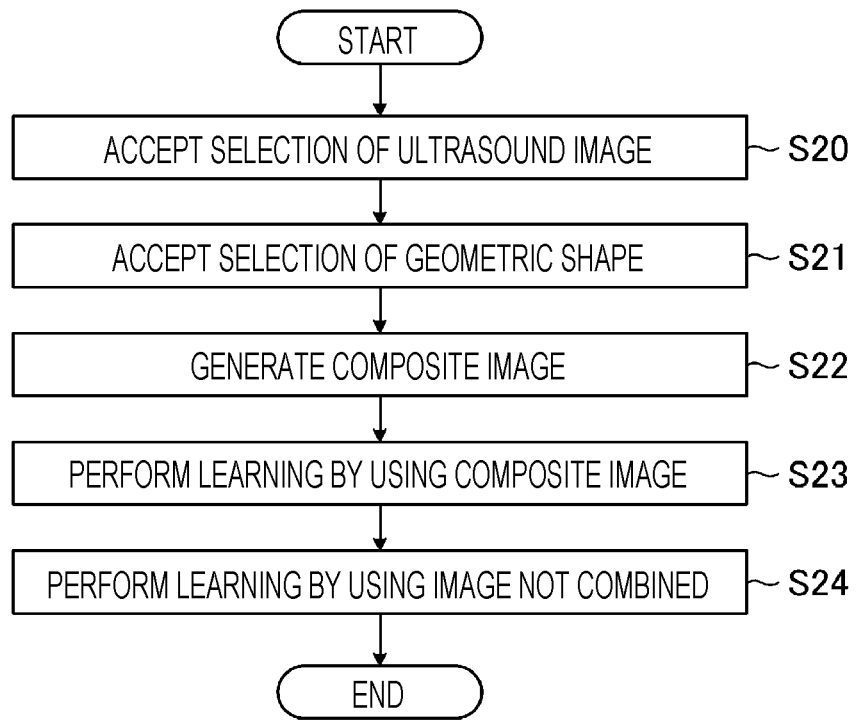
FIG. 15 is a flowchart for explaining a learning method performed by using the machine learning system.

FIG. 15 is a flowchart for explaining a learning method performed by using the machine learning system 10.

First, the selection unit 22A accepts selection of an ultrasound image (step S20). Next, the selection unit 22A accepts selection of a geometric shape (step S21). Thereafter, the geometric-shape combining unit 22B combines the selected ultrasound image and the selected geometric shape and generates a composite image (step S22). Next, the training unit 22C makes the learning model 30 perform machine learning by using the composite image (step S23). Thereafter, the training unit 22C makes the learning model 30 perform machine learning by using the ultrasound image that is not combined (step S24).

In this embodiment, a composite image and an ultrasound image not combined with a geometric shape are used to perform machine learning. The use of a composite image and an ultrasound image in machine learning will be described below.

Figure 16A:
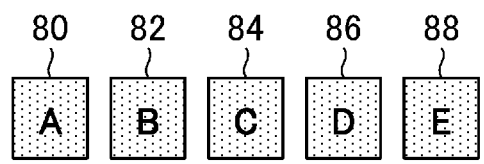
FIGS. 16A, 16B, and 16C are diagrams for conceptually explaining examples of learning data.
Figure 16B:
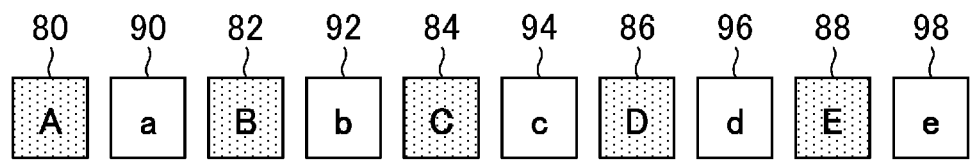
Figure 16C:
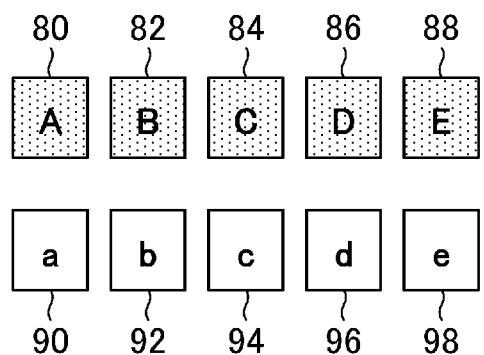

FIGS. 16A, 16B, and 16C are diagrams for conceptually explaining examples of learning data in the present invention.

FIG. 16A illustrates learning data used in the first embodiment. In the first embodiment, composite images are used as learning data, and therefore, mini-batches constituted by the composite images are prepared. In the case illustrated in FIG. 16A, learning data including A batch 80, B batch 82, C batch 84, D batch 86, and E batch 88 is prepared, and each of the batches is constituted by, for example, 200 composite images. Therefore, in one epoch, A batch 80, B batch 82, C batch 84, D batch 86, and E batch 88 are once input to the learning model 30 to perform machine learning.

FIG. 16B illustrates learning data used in the second embodiment. In the second embodiment, composite images and ultrasound images not combined with geometric shapes are used as learning data, and therefore, mini-batches constituted by the composite images and the ultrasound images are prepared. In the case illustrated in FIG. 16B, learning data including A batch 80, a batch 90, B batch 82, b batch 92, C batch 84, c batch 94, D batch 86, d batch 96, E batch 88, and e batch 98 is prepared. Each of A batch 80, B batch 82, C batch 84, D batch 86, and E batch 88 is constituted by, for example, 200 composite images. Each of a batch 90, b batch 92, c batch 94, d batch 96, and e batch 98 is constituted by, for example, 200 ultrasound images. For A batch 80 and a batch 90, the same ultrasound images are used. Specifically, ultrasound images used to form composite images that constitute A batch 80 constitute a batch 90, and the same applies to the other batches. In one epoch, A batch 80, a batch 90, B batch 82, b batch 92, C batch 84, c batch 94, D batch 86, d batch 96, E batch 88, and e batch 98 are once input to the learning model 30 to perform machine learning.

FIG. 16C illustrates another example of learning data used in the second embodiment. In the case illustrated in FIG. 16C, a first epoch constituted by A batch 80, B batch 82, C batch 84, D batch 86, and E batch 88 and a second epoch constituted by a batch 90, b batch 92, c batch 94, d batch 96, and e batch 98 are performed. As described with reference to FIG. 16B, the same ultrasound images are used for A batch 80 and a batch 90.

As described above, in this embodiment, composite images and ultrasound images not combined are used as learning data, and therefore, learning by the learning model 30 that recognizes the position of a region of interest and the type of region of interest regardless of a superimposed and displayed geometric shape can be performed more effectively.

Third Embodiment

A third embodiment will be described. In this embodiment, a description of a recognizer implemented as a trained model for which machine learning has been performed by the machine learning system 10 described above will be given. This recognizer is included in an ultrasonic endoscope system.

Figure 17:
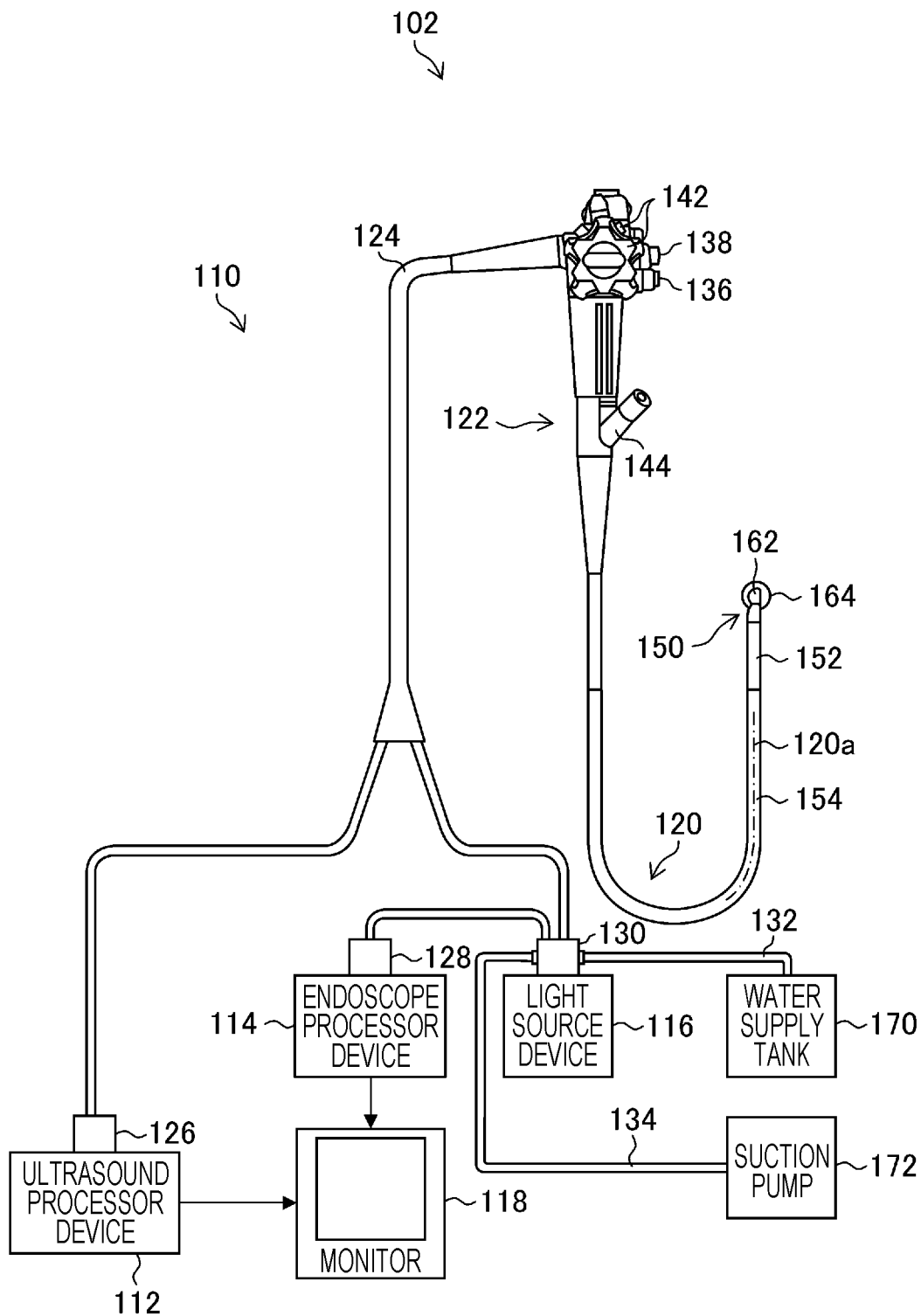
FIG. 17 is a schematic diagram illustrating an overall configuration of an ultrasonic endoscope system.

FIG. 17 is a schematic diagram illustrating an overall configuration of an ultrasonic endoscope system (ultrasound diagnostic apparatus) that includes as a recognizer 206, the learning model 30 (trained model) for which machine learning is completed in the machine learning system 10 described above.

As illustrated in FIG. 17, an ultrasonic endoscope system 102 includes an ultrasonic endoscope 110, an ultrasound processor device 112 that generates an ultrasound image, an endoscope processor device 114 that generates an endoscopic image, a light source device 116 that supplies illumination light for illuminating the inside of a body cavity to the ultrasonic endoscope 110, and a monitor 118 that displays an ultrasound image and an endoscopic image.

The ultrasonic endoscope 110 includes an insertion part 120 that is inserted into the body cavity of a subject, a hand operation part 122 that is connected to the proximal end portion of the insertion part 120 and is operated by an operator, and a universal cord 124 that has one end connected to the hand operation part 122. At the other end of the universal cord 124, an ultrasonic connector 126 connected to the ultrasound processor device 112, an endoscope connector 128 connected to the endoscope processor device 114, and a light source connector 130 connected to the light source device 116 are provided.

The ultrasonic endoscope 110 is connected to the ultrasound processor device 112, the endoscope processor device 114, and the light source device 116 with the connectors 126, 128, and 130 therebetween so as to be detachable. To the light source connector 130, an air/water supply tube 132 and a suction tube 134 are connected.

The monitor 118 receives video signals generated by the ultrasound processor device 112 and the endoscope processor device 114 and displays an ultrasound image and an endoscopic image. The ultrasound image and the endoscopic image can be displayed such that, for example, only one of the images is displayed on the monitor 118 by switching between the images as appropriate or both of the images are simultaneously displayed.

On the hand operation part 122, an air/water supply button 136 and a suction button 138 are arranged in parallel and a pair of angle knobs 142 and a treatment tool insertion port 144 are provided.

The insertion part 120 has a distal end, a proximal end, and a longitudinal axis 120*a* and is constituted by a distal end main body 150 formed of a hard material, a bending part 152 connected to the proximal end side of the distal end main body 150, and a soft part 154 that connects the proximal end side of the bending part 152 and the distal end side of the hand operation part 122, that is long and narrow, and that has flexibility, in this order from the distal end side. That is, the distal end main body 150 is provided on the distal end side of the insertion part 120 in the direction of the longitudinal axis 120*a*. The bending part 152 is remotely operated and bent in response to rotation of the pair of angle knobs 142 provided on the hand operation part 122. Accordingly, the distal end main body 150 can be oriented in a desired direction.

To the distal end main body 150, an ultrasound probe 162 and a pouch-like balloon 164 in which the ultrasound probe 162 is wrapped are attached. The balloon 164 can be inflated or deflated when water is supplied from a water supply tank 170 or water in the balloon 164 is sucked by a suction pump 172. The balloon 164 can be inflated until it comes into contact with the interior wall of a body cavity in order to prevent attenuation of ultrasound and an ultrasonic echo (echo signal) during an ultrasonic observation.

To the distal end main body 150, an endoscopic observation unit that is not illustrated and that has an observation unit including an object lens, an imaging element, and so on and an illumination unit is attached. The endoscopic observation unit is provided behind the ultrasound probe 162 (on a side closer to the hand operation part 122).

Figure 18:
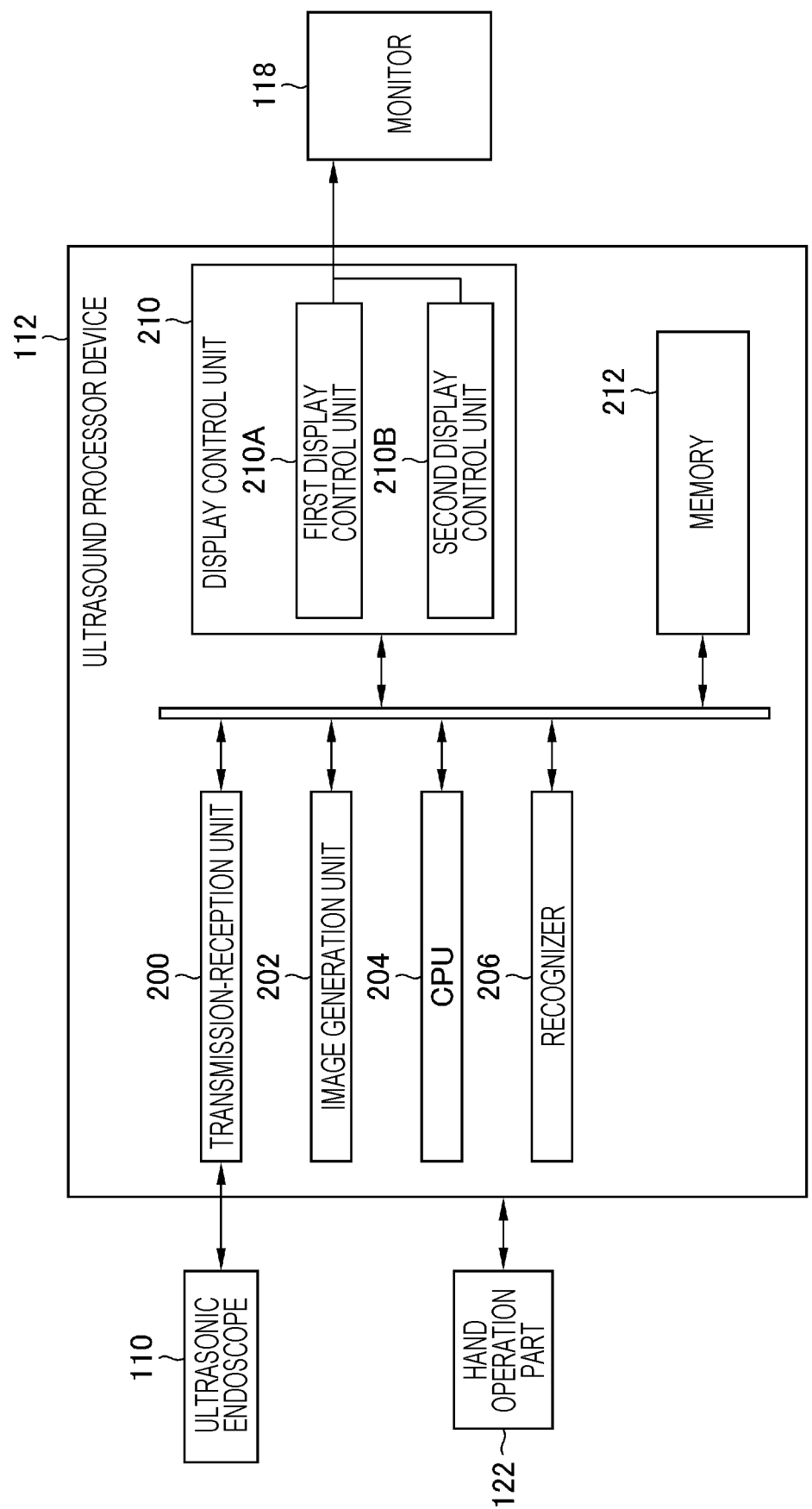
FIG. 18 is a block diagram illustrating an embodiment of an ultrasound processor device.

FIG. 18 is a block diagram illustrating an embodiment of the ultrasound processor device.

The ultrasound processor device 112 illustrated in FIG. 18 recognizes on the basis of sequentially obtained time-series ultrasound images, the position and type of a region of interest in the ultrasound images and provides information indicating the results of recognition to the user.

The ultrasound processor device 112 illustrated in FIG. 18 includes a transmission-reception unit 200, an image generation unit 202, a CPU (central processing unit) 204, the recognizer 206, a display control unit 210, and a memory 212, and processes performed by these units are implemented by one or more processors. As the recognizer 206, the learning model 30 trained in the machine learning system 10 described above is included with the parameters retained as is.

The CPU 204 operates on the basis of various programs, including an ultrasound image processing program according to the present invention, stored in the memory 212, centrally controls the transmission-reception unit 200, the image generation unit 202, the recognizer 206, and the display control unit 210, and functions as some of these units.

The transmission-reception unit 200 and the image generation unit 202 sequentially obtain time-series ultrasound images.

The transmission-reception unit 200 includes a transmission unit that generates a plurality of driving signals to be applied to a plurality of ultrasonic transducers of the ultrasound probe 162 of the ultrasonic endoscope 110, gives the plurality of driving signals, respective delay times on the basis of a transmission delay pattern selected by a scan control unit not illustrated, and applies the plurality of driving signals to the plurality of ultrasonic transducers.

The transmission-reception unit 200 includes a reception unit that amplifies a plurality of detection signals respectively output from the plurality of ultrasonic transducers of the ultrasound probe 162 and converts the detection signals that are analog signals to digital detection signals (which are also referred to as RF (radio frequency) data). The RF data is input to the image generation unit 202.

The image generation unit 202 gives the plurality of detection signals indicated by the RF data, respective delay times on the basis of a reception delay pattern selected by the scan control unit and adds up the detection signals to thereby perform a reception focus process. With this reception focus process, sound-ray data in which the focus of an ultrasonic echo is narrowed down is formed.

The image generation unit 202 further corrects the sound-ray data for attenuation based on a distance in accordance with the depth of the position of reflection of ultrasound, with STC (sensitivity time-gain control), subsequently generates envelope data by performing an envelope detection process with, for example, a low-pass filter, and stores envelope data for one frame, or more preferably a plurality of frames, in a cine memory not illustrated. The image generation unit 202 performs preprocessing including log (logarithmic) compression and a gain adjustment for the envelope data stored in the cine memory and generates a B-mode image.

Accordingly, the transmission-reception unit 200 and the image generation unit 202 sequentially obtain time-series B-mode images (hereinafter referred to as "ultrasound images").

The recognizer 206 performs a process of recognizing information about the position of a region of interest in the ultrasound images on the basis of the ultrasound images and a process of classifying the region of interest into one of a plurality of classes (types) on the basis of the ultrasound images. The recognizer 206 is implemented as a trained model for which machine learning has been performed in the machine learning system 10 described above.

The region of interest in this example is any of various organs in the ultrasound images (cross-sectional images that are the B-mode images), and examples thereof include the pancreas, the main pancreatic duct, the spleen, the splenic vein, the splenic artery, and the gallbladder.

In response to sequential input of time-series ultrasound images, the recognizer 206 recognizes the position of a region of interest for each of the input ultrasound images, outputs information about the position, recognizes a class among the plurality of classes to which the region of interest belongs, and outputs information (class information) indicating the recognized class.

The position of a region of interest can be, for example, the center position of a rectangular shape that encloses the region of interest. The class information in this example is information indicating the type of organ.

The display control unit 210 includes a first display control unit 210A that makes the monitor 118, which is a display unit, display the time-series ultrasound images and a second display control unit 210B that makes the monitor 118 display information about the region of interest.

The first display control unit 210A makes the monitor 118 display the ultrasound images sequentially obtained by the transmission-reception unit 200 and the image generation unit 202. In this example, a motion picture showing the ultrasound cross-sectional images is displayed on the monitor 118.

The first display control unit 210A performs an accepting process of accepting a freeze command from the hand operation part 122 of the ultrasonic endoscope 110 and when, for example a freeze button of the hand operation part 122 is operated and a freeze instruction is accepted, performs a process of switching sequential display of the ultrasound images displayed on the monitor 118 to fixed display of one ultrasound image (an ultrasound image at the present time point).

The second display control unit 210B makes the class information indicating the class of the region of interest recognized by the recognizer 206 be superimposed and displayed at the position of the region of interest in the ultrasound images displayed on the monitor 118.

In response to accepting the freeze instruction, the second display control unit 210B fixes the position of the class information relative to the region of interest during a period in which the ultrasound image displayed on the monitor 118 is kept displayed as a still image.

As described above, in this embodiment, the learning model 30 for which machine learning has been performed in the machine learning system 10 is used as the recognizer 206. Accordingly, a region of interest present in an ultrasound image can be recognized with high accuracy.

OTHERS

In the above-described embodiments, the hardware configuration of the processing units (for example, the selection unit 22A, the geometric-shape combining unit 22B, and the training unit 22C) that perform various types of processing is implemented as various processors as described below. The various processors include a CPU (central processing unit), which is a general-purpose processor executing software (program) to function as various processing units, a programmable logic device (PLD), such as an FPGA (field-programmable gate array), which is a processor for which the circuit configuration can be changed after manufacturing, and a dedicated electric circuit, such as an ASIC (application-specific integrated circuit), which is a processor having a circuit configuration that is designed only for performing a specific process.

One processing unit may be configured as one of the various processors or two or more processors of the same type or different types (for example, a plurality of FPGAs or a combination of a CPU and an FPGA). Further, a plurality of processing units may be configured as one processor. As the first example of configuring a plurality of processing units as one processor, a form is possible in which one or more CPUs and software are combined to configure one processor, and the processor functions as the plurality of processing units, a representative example of which is a computer, such as a client or a server. As the second example thereof, a form is possible in which a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above.

Further, the hardware configuration of the various processors is more specifically an electric circuit (circuitry) in which circuit elements, such as semiconductor elements, are combined.

The configurations and functions described above can be implemented as any hardware, software, or a combination thereof as appropriate. For example, the present invention is applicable to a program for causing a computer to perform the above-described processing steps (processing procedure), a computer-readable recording medium (non-transitory recording medium) to which the program is recorded, or a computer in which the program can be installed.

Although an example of the present invention has been described above, the present invention is not limited to the embodiments described above, and various modifications can be made without departing from the gist of the present invention as a matter of course.

REFERENCE SIGNS LIST 10 machine learning system
12 communication unit 14 image database
16 geometric-shape database
20 operation unit
22 processor
22A selection unit
22B geometric-shape combining unit
22C training unit
24 RAM
26 ROM
28 display unit
30 learning model
32 bus

What is claimed is:

1. A machine learning system comprising: an image database that stores a plurality of medical images; a geometric-shape database that stores geometric shapes to be superimposed on the medical images; a processor; and a learning model, wherein
the processor is configured to perform
a selection accepting process of accepting selection of a medical image from among the medical images stored in the image database and selection of a geometric shape from among the geometric shapes stored in the geometric-shape database,
a geometric-shape combining process of combining the selected medical image and the selected geometric shape and generating a composite image, and
a training process of making the learning model perform learning by using the composite image.

2. The machine learning system according to claim 1, wherein in the training process, the medical image accepted in the selection accepting process is used at least twice, and the learning model is made to perform learning by first using the medical image for which the geometric-shape combining process has not been performed and by next using the composite image for which the geometric-shape combining process has been performed.

3. The machine learning system according to claim 1, wherein the processor is configured to perform a size accepting process of accepting a size of the geometric shape that is combined in the geometric-shape combining process, and
in the geometric-shape combining process, the geometric shape is combined with the medical image on the basis of the size accepted in the size accepting process.

4. The machine learning system according to claim 1, wherein the geometric-shape database stores in association with each geometric shape of the geometric shapes, at least one of information about a combination-allowed region in the medical images or maximum and minimum values of a size of the geometric shape.

5. The machine learning system according to claim 1, wherein the image database stores in association with each of the medical images, information about a region of interest, and
in the geometric-shape combining process, the geometric shape is combined such that at least a portion of the geometric shape is superimposed on the region of interest, by using the information about the region of interest.

6. The machine learning system according to claim 1, wherein the image database stores in association with each of the medical images, information about a region of interest, and
in the geometric-shape combining process, the geometric shape is combined in a region outside the region of interest, by using the information about the region of interest.

7. The machine learning system according to claim 1, wherein in the geometric-shape combining process, a plurality of composite images are generated by changing a position and a size of the selected geometric shape, and
in the training process, the learning model is made to perform learning by using the plurality of composite images.

8. The machine learning system according to claim 1, wherein the medical images are images obtained from an ultrasound diagnostic apparatus.

9. A recognizer that is trained in the machine learning system according to claim 1 and that recognizes a region of interest from a medical image to which a geometric shape is added.

10. A learning method using a machine learning system comprising: an image database that stores a plurality of medical images; a geometric-shape database that stores geometric shapes to be superimposed on the medical images; a processor; and a learning model, wherein
the processor is configured to perform
a selection accepting step of accepting selection of a medical image from among the medical images stored in the image database and selection of a geometric shape from among the geometric shapes stored in the geometric-shape database,
a geometric-shape combining step of combining the selected medical image and the selected geometric shape and generating a composite image, and
a training step of making the learning model perform learning by using the composite image.

11. A non-transitory, computer-readable tangible recording medium to which a program for causing, when read by a computer, the computer to execute the learning method according to claim 10 is recorded.

* * * * *